United States Patent Office 2,698,857
Patented Jan. 4, 1955

2,698,857

PROCESS OF PRODUCING CONJUGATED FATTY ACIDS

Richard T. Arnold, St. Paul, Minn., assignor to General Mills, Inc., a corporation of Delaware No Drawing. Application July 24, 1952,
Serial No. 300,772

2 Claims. (Cl. 260—405.5)

The present invention relates to the production of conjugated fatty acids from non-conjugated unsaturated fatty acids, particularly monoolefinic fatty acids.

Conjugated fatty acids are extremely useful in the production of protective coating compositions. Coating compositions prepared with conjugated fatty acids dry rapidly to hard and tough films. Accordingly, fatty acids with conjugated unsaturation are far superior to fatty acids which are slower drying. The present invention relates to a process of preparing conjugated fatty acids from non-conjugated unsaturated fatty acids, and particularly from monoolefinic fatty acids. The process results not only in an increase in the amount of unsaturation, but also the unsaturation which is produced is in the more reactive, conjugated form.

It is, therefore, an object of the present invention to provide a novel process of producing conjugated fatty acids from non-conjugated unsaturated fatty acids.

The process involves the addition of hypochlorous acid to the double bond of an unsaturated fatty acid to produce the corresponding chlorohydrin. The chlorohydrin is then converted to the diacetate, and the diacetate pyrolyzed to yield the conjugated fatty acid. The reactions are illustrated as follows in which the portion of the molecule containing the double bond is illustrated.

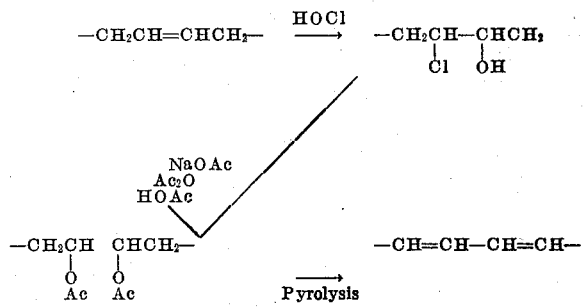

The first step of the process is carried out at from 5–35° C. An aqueous solution of the sodium or potassium salt of the fatty acid is prepared and an alkali metal hypochlorite is added. Carbon dioxide is then passed through the mixed solution and serves to liberate hypochlorous acid from the hypochlorite. The hypochlorous acid adds to the double bond to form the chlorohydrin. This reaction may require from 1½–2 hours.

The chlorohydrin is converted to the diacetate by reaction with a mixture of an alkali metal acetate, acetic acid and acetic anhydride. Reaction proceeds readily at temperatures of from 170–200° C. Time periods of from 4–16 hours may be employed. This results in the direct production of the diacetate from the chlorohydrin. If desired, the elements of HCl may be first removed from the chlorohydrin by means of the alkali metal acetate after which acetic anhydride and alkali metal acetate may be added to facilitate the reaction. Since, however, the complete acetylation proceeds readily in a single operation, there is no particular advantage in carrying out the reaction stepwise.

The diacetate may be pyrolyzed at temperatures of from 350–475° C. In general, lower temperatures within this range are preferred, since higher yields of conjugated material are obtained. A somewhat more extended time period is required at lower temperatures. Temperatures around 425° C. are desirable since the rate of reaction is quite rapid and the yields of conjugated material are good.

*Example*

A one molar solution of potassium hypochlorite was prepared by dissolving 30 g. of calcium hypochlorite in 120 ml. of water. A solution of 21 g. of potassium carbonate and 6 g. of potassium hydroxide in 60 ml. of water was then added. The resulting mixture was stirred and filtered to yield a one molar solution of potassium hypochlorite.

60 g. of commercial oleic acid (containing approximately 80% oleic acid and 8% saturated fatty acids) and 14.1 g. of potassium hydroxide were dissolved in 400 cc. of water to yield a 15% potassium oleate solution. Carbon dioxide was passed through the solution and a first 50 cc. portion of the potassium hypochlorite solution was added. After 25 minutes, a second 50 cc. portion of the potassium hypochlorite was added. The reaction mixture foamed somewhat, and accordingly was diluted with 200 cc. additional water. This reduced the solution to a 10% oleate concentration. A third 50 cc. portion of potassium hypochlorite was added 50 minutes after the beginning of the reaction and was consumed 35 minutes thereafter. A fourth portion in the amount of 25 cc. of the hypochlorite was added and was consumed in 30 minutes, at which time a fifth portion of potassium hypochlorite in the amount of 75 cc. was added. The total time for the addition of the hypochlorite was two hours, and the total reaction time was 2½ hours. The excess hypochlorite was then destroyed with a 20% sodium thiosulfate solution. The reaction mixture was then poured into a separatory funnel containing 100 ml. of concentrated hydrochloric acid diluted with water and 300 cc. of benzene. The mixture was agitated vigorously until a fluid benzene layer was obtained. The aqueous layer was removed and extracted three times with 50 ml. portions of benzene. The benzene extract and the benzene washings were combined and washed with 200 cc. of 5% HCl, followed by 200 cc. portions of water until the wash water was neutral to litmus. The benzene was distilled off under vacuum to yield a yellow distillate having the following properties:

| | |
|---|---|
| $n_d^{25}$ | 1.4742 |
| I. V. | 1.32, 1.40 |
| Per cent chlorine | 11.0 |
| Acetyl No. | 99.6 |
| Acid value | 137 |
| Saponification value | 324 |

15 g. of the oleic acid chlorohydrin prepared above, 13 g. of potassium acetate, 24.6 ml. of acetic anhydride and 16 ml. of glacial acetic acid were sealed in a glass pressure tube. The tube was heated for 16 hours at 170° C. The cooled contents of the tube were then poured into a beaker containing water. The organic layer was taken up in ether and separated from the aqueous layer. The aqueous layer was extracted three times with ether and the washings combined with the original extracts. The combined ether extract was then washed with 20 ml. portions of 20% NaCl solution and finally with water. The ether solution was then dried over sodium sulfate. The ether and acetic acid were distilled under vacuum, and then 10 ml. of toluene was added and the mixture again distilled in order to remove the last traces of acetic acid. The following analytical values were found on the product:

| | |
|---|---|
| Per cent chlorine | 0.95 |
| Acid No. | 120.1 |
| Saponification value | 384.8 |
| Acetyl No. | 3.0 |

The above 9, 10 diacetoxystearic acid was pyrolyzed by passing it, in the presence of nitrogen, through a stainless steel tube heated to 445–456° C. The product obtained was subjected to distillation up to 60° C. at 20 mm. of mercury to remove acetic acid and other low boiling materials. The residue was then fractionated into the following fractions having the properties shown in the following table:

| Fraction | B. P., °C. | Wt., g. | Percent conj.[1] diene | Percent Cl |
|---|---|---|---|---|
| residue after removal of HOAc. | | 44.0 | 18.8 | |
| –1 | 95–105°/4 mm | 3.8 | None | 0.30 |
| –2 | to 160°/.03 mm | 13.4 | None | 0.27 |
| –3 | 160°/.04–180°/.1 mm | 13.8 | 17.7 | 0.23 |
| –4 | 180°/.1–210°/.2 mm | 4.0 | 23.3 | 0.12 |

[1] As determined by V. V. spectroscopy.

While oleic acid was used in the above example, the process is applicable to monolefinic and non-conjugated polyolefinic fatty acids in general when they contain from 8–22 carbon atoms. The process may be carried out on the mixed fatty acids of a fat or oil, or any selected fraction thereof. Saturated fatty acids are not affected by the process and may be left in any mixed starting material if desired. Similarly, while potassium salts were employed in the example because of their increased solubility and reactivity, the sodium salts may be substituted with advantage because of their lower cost.

I claim as my invention:

1. Process of producing conjugated fatty acids from non-conjugated unsaturated fatty acids containing from 8–22 carbon atoms which comprises reacting an aqueous solution of an alkali metal salt of said fatty acid with hypochlorous acid to form the chlorohydrin, reacting the chlorohydrin with a mixture of acetic anhydride, acetic acid and an alkali metal acetate to form the diacetate and pyrolyzing the diacetate to the conjugated fatty acid.

2. Process of producing conjugated fatty acids from monoolefinic fatty acids containing from 8–22 carbon atoms which comprises preparing a solution of an alkali metal salt of the fatty acid and an alkali metal hypochlorite, passing carbon dioxide through said solution to liberate hypochlorous acid, reacting the hypochlorous acid with the fatty salt at a temperature within the range of 0–35° C. to form the chlorohydrin, reacting the chlorohydrin with a mixture of an alkali metal acetate, acetic anhydride and acetic acid at a temperature of from 170–200° C. to form the diacetate of the fatty acid and pyrolyzing the diacetate at temperatures within the approximate range of 350–475° C.

References Cited in the file of this patent

UNITED STATES PATENTS 2,598,729    Teeter _____ June 3, 1952